United States Patent
Shin et al.

(10) Patent No.: US 12,413,415 B2
(45) Date of Patent: Sep. 9, 2025

(54) ELECTRONIC DEVICE THAT PERFORMS USER AUTHENTICATION USING HOMOMORPHIC ENCRYPTION AND CONTROL METHOD THEREOF

(71) Applicant: CRYPTO LAB INC., Seoul (KR)

(72) Inventors: Junbum Shin, Suwon-si (KR); Jungjoo Seo, Seoul (KR)

(73) Assignee: CRYPTO LAB INC., Seoul (KR)

( * ) Notice: Subject to any disclaimer, the term of this patent is extended or adjusted under 35 U.S.C. 154(b) by 87 days.

(21) Appl. No.: 18/594,136

(22) Filed: Mar. 4, 2024

(65) Prior Publication Data
US 2024/0313976 A1  Sep. 19, 2024

(30) Foreign Application Priority Data

Mar. 3, 2023 (KR) .......... 10-2023-0028611
Feb. 21, 2024 (KR) .......... 10-2024-0025287

(51) Int. Cl.
*H04L 9/32* (2006.01)

(52) U.S. Cl.
CPC .......... *H04L 9/3242* (2013.01); *H04L 9/3231* (2013.01)

(58) Field of Classification Search
CPC ....... H04L 9/32; H04L 9/3242; H04L 9/3231; H04L 9/0819
See application file for complete search history.

(56) References Cited

U.S. PATENT DOCUMENTS

2015/0227930 A1* 8/2015 Quigley ................ H04L 9/3013
                                                         705/72
2016/0182226 A1* 6/2016 Yasuda ................ H04L 9/0869
                                                         380/28

(Continued)

OTHER PUBLICATIONS

Yang Wen-Cui et al., English translation of Chinese patent application No. 202010410537 (publication No. CN113672890): Identity authentication method and device, electronic equipment and computer storage medium, WIPO (Year: 2021).*

*Primary Examiner* — Shanto Abedin
(74) *Attorney, Agent, or Firm* — Frost Brown Todd LLP

(57) ABSTRACT

Disclosed are an electronic device and a control method thereof. The electronic device includes: a communication device; a memory configured to store an encryption key and a decryption key for performing homomorphic encryption; and a processor configured to be connected to the memory to control the electronic device, in which the processor is configured to: based on user's identification information and a first password being input to register the user's identification information and the first password, acquire a hash value using the first password, encrypt the hash value using the encryption key, transmit the identification information and the encrypted hash value to a server through the communication device, based on the identification information and a second password being input to log in to the server, load the encryption key and the decryption key and transmit the identification information to the server through the communication device, based on a first nonce being received from the server, acquire a first authentication value using the decryption key, the second password, and the first nonce and transmit the first authentication value to the server through the communication device, and based on a second authentication value being received from the server, decrypt the second authentication value, which is generated using the (Continued)

first authentication value and a second nonce, using the decryption key to acquire a third authentication value and transmit the third authentication value to the server through the communication device. In this case, the server authenticates the user using the third authentication value.

14 Claims, 8 Drawing Sheets

(56) References Cited

U.S. PATENT DOCUMENTS

2021/0211291 A1* 7/2021 Jindal .................... H04L 9/3231
2023/0353376 A1* 11/2023 Marotzke .............. H04L 9/3213

* cited by examiner

ELECTRONIC DEVICE THAT PERFORMS USER AUTHENTICATION USING HOMOMORPHIC ENCRYPTION AND CONTROL METHOD THEREOF

TECHNICAL FIELD

The present disclosure relates to an electronic device and a control method thereof, and more particularly, to an electronic device for performing user authentication using homomorphic encryption and a control method thereof.

BACKGROUND ART

As communication technology develops and electronic devices spread, efforts are continuously made to maintain communication security between the electronic devices. Accordingly, encryption/decryption technology is used in most communication environments.

When messages encrypted by the encryption technology are delivered to the other party, the other party needs to perform decryption in order to use the messages. In this case, the other party wastes resources and time in the process of decrypting the encrypted data. In addition, when the third party hacks messages while the other party temporarily decrypts the messages for an operation, there is a problem in that the messages may be easily leaked to the third party.

In order to solve this problem, a homomorphic encryption method is being studied. According to the homomorphic encryption, even if an operation is performed on encrypted messages themselves without decrypting the encrypted information, it is possible to obtain the same result as the encrypted value after an operation on a plaintext. Accordingly, various operations may be performed without decrypting the encrypted messages.

Meanwhile, in order for a user to access any system or perform a specific action in the system, it is essential for a user authentication procedure to confirm user's identity and rights granted to the user. Password authentication is the most representative authentication method, and is a method of proving identity by proving that the user knows a secret in the form of a string. In addition, multi-factor authentication (MFA) is a method of additionally requiring authentication for "inherent" such as biometric information, "possession" such as hardware tokens, "location", etc., in addition to a password, which is a means of confirming "knowledge" during the authentication process, and may respond to password leaks and apply higher security to access sensitive information such as personal information and financial assets.

However, servers and software that store information for user authentication are exposed to various threat models such as network wiretapping, attack, and malicious insider, and information and authentication data for the user authentication may be leaked. Passwords whose plaintext is leaked are used for credential stuffing which attempts automated indiscriminate authentication with the same account name not only for the service but also for other services.

Therefore, to prevent direct leakage of the password plaintext, a value obtained by applying a cryptographic hash to the password is stored on the server. However, even if the password is stored in the form of a hashed hash value, attacks such as rainbow table attack and brute force attack occur. To prevent such attacks, SALT, which is a public value, is included in an input of a hash algorithm to overcome the rainbow table attack, and ROUND, which is the hash repetition number, is applied to increase costs of the brute force attack. However, since the password distribution is biased toward being easy for people to memorize, a technology for finding the password from the hash value using password generation methodology and the brute force software using powerful SIMD hardware such as GPU is also developing.

Therefore, there is a need to find a method of user authentication with more enhanced security.

DISCLOSURE

Technical Problem

According to an aspect of the present disclosure, an electronic device includes: a communication device; a memory configured to store an encryption key and a decryption key for performing homomorphic encryption; and a processor configured to be connected to the memory to control the electronic device, in which the processor is configured to: based on user's identification information and a first password being input to register the user's identification information and the first password, acquire a hash value using the first password, encrypt the hash value using the encryption key, transmit the identification information and the encrypted hash value to a server through the communication device, based on the identification information and a second password being input to log in to the server, load the encryption key and the decryption key and transmit the identification information to the server through the communication device, based on a first nonce being received from the server, acquire a first authentication value using the decryption key, the second password, and the first nonce and transmit the first authentication value to the server through the communication device, and based on a second authentication value being received from the server, decrypt the second authentication value, which is generated using the first authentication value and a second nonce, using the decryption key to acquire a third authentication value and transmit the third authentication value to the server through the communication device. In this case, the server authenticates the user using the third authentication value.

The processor may be configured to input the decryption key to a first hash function to acquire a first hash value, concatenate the first hash value and the first password, and input the concatenated value to a second hash function to acquire a second hash value, encrypt the second hash value using the encryption key, and transmit the identification information and the encrypted second hash value to the server through the communication device.

based on the first nonce being received from the server, the processor may be configured to input the decryption key to the first hash function to acquire a third hash value, concatenate the third hash value and the second password, and input the concatenated value to the second hash function to acquire a fourth hash value, encrypt the fourth hash value using the encryption key, and add the first nonce to the encrypted fourth hash value to acquire the first authentication value.

The server may add a value obtained by subtracting the first nonce and the encrypted hash value from the first authentication value to the second nonce to acquire the second authentication value, and the processor may be configured to receive the second authentication value from the server through the communication device.

based on the second authentication value being received, the processor may be configured to decrypt the second authentication value using the decryption key, input the decrypted value to a third hash function to acquire the third authentication value, and transmit the third authentication value to the server through the communication device, and the server may identify whether the third authentication value and a value obtained by inputting the second nonce to the third hash function are the same to authenticate the user.

According to another aspect of the present disclosure, an electronic device includes: a communication device; a memory configured to store an encryption key and a decryption key for performing homomorphic encryption; and a processor configured to be connected to the memory to control the electronic device, in which the processor is configured to: based on user's identification information and a first biometric information are input to register the user's identification information and the first biometric information, preprocess the first biometric information, encrypt the preprocessed first biometric information using the encryption key, transmit the identification information and the encrypted biometric information to a server through the communication device, based on the identification information and second biometric information being input to log in to the server, load the encryption key and the decryption key and transmit the identification information to the server through the communication device, based on a first nonce being received from the server, acquire a first authentication value using the second biometric information and the first nonce and transmit the first authentication value to the server through the communication device, and based on a second authentication value being received from the server, decrypt the second authentication value, which is generated using the first authentication value and a second nonce, using the decryption key to acquire a third authentication value and transmit the third authentication value to the server through the communication device, and the server authenticates the user using the third authentication value.

based on the first nonce being received from the server, the processor may be configured to preprocess the second biometric information, add the first nonce to the preprocessed value to acquire a first value, and encrypt the first value using the encryption key to acquire the first authentication value.

The server may add the second nonce to a value obtained by multiplying the encrypted biometric information by a value obtained by subtracting the first nonce from the first authentication value to acquire the second authentication value, and the processor may be configured to receive the second authentication value from the server through the communication device.

based on the second authentication value being received, the processor may be configured to decrypt the second authentication value using the decryption key to acquire the third authentication value, and transmit the third authentication value to the server through the communication device, and the server may identify whether a value obtained by subtracting the second nonce from the third authentication value is greater than or equal to a threshold to authenticate the user.

According to still another aspect of the present disclosure, a control method of an electronic device for storing an encryption key and a decryption key for performing homomorphic encryption includes: based on user's identification information and the first password being input to register the user's identification information and the first password, acquiring a hash value using a first password; encrypting the hash value using the encryption key; transmitting the identification information and the encrypted hash value to a server; based on the identification information and a second password being input to log in to the server, loading the encryption key and the decryption key and transmitting the identification information to the server; based on a first nonce being received from the server, acquiring a first authentication value using the decryption key, the second password, and the first nonce and transmit the first authentication value to the server; and based on a second authentication value being received from the server, decrypting the second authentication value, which is generated using the first authentication value and a second nonce, using the decryption key to acquire a third authentication value and transmit the third authentication value to the server, in which the server authenticates the user using the third authentication value.

The acquiring of the hash value may include: inputting the decryption key to a first hash function to acquire a first hash value; concatenating the first hash value and the first password, and inputting the concatenated value to a second hash function to acquire a second hash value; and encrypting the second hash value using the encryption key, and in the transmitting of the encrypted hash value to the server, the identification information and the encrypted second hash value may be transmitted to the server.

The transmitting of the first authentication value may include: based on the first nonce being received from the server, inputting the decryption key to the first hash function to acquire a third hash value; concatenating the third hash value and the second password, and inputting the concatenated value to the second hash function to acquire a fourth hash value; encrypting the fourth hash value using the encryption key, and adding the first nonce to the encrypted fourth hash value to acquire the first authentication value.

The server may add a value obtained by subtracting the first nonce and the encrypted hash value from the first authentication value to the second nonce to acquire the second authentication value.

The transmitting of the third authentication value may include: based on the second authentication value being received, decrypting the second authentication value using the decryption key; inputting the decrypted value to a third hash function to acquire the third authentication value; and transmitting the third authentication value to the server, and the server may identify whether the third authentication value and a value obtained by inputting the second nonce to the third hash function are the same to authenticate the user.

According to still yet another aspect of the present disclosure, a control method of an electronic device for storing an encryption key and a decryption key for performing homomorphic encryption includes: based on user's identification information and a first biometric information being input to register the user's identification information and the first biometric information, preprocessing the first biometric information; encrypting the preprocessed first biometric information using the encryption key; transmitting the identification information and the encrypted biometric information to a server; based on the identification information and second biometric information being received to log in to the server, loading the encryption key and the decryption key and transmitting the identification information to the server; based on a first nonce is received from the server, acquiring a first authentication value using the second biometric information and the first nonce and transmitting the first authentication value to the server; and based on a second authentication value generated using the first authentication value and a second nonce being received from the server, decrypting the second authentication value using the decryption key to acquire a third authentication value and transmitting the third authentication value to the server, in which the server authenticates the user using a third authentication value.

The transmitting of the first authentication value may include: based on the first nonce being received from the server, preprocessing the second biometric information; adding the first nonce to the preprocessed value to acquire a first value; and encrypting the first value using the encryption key to acquire the first authentication value.

The server may add the second nonce to a value obtained by multiplying the encrypted biometric information by a value obtained by subtracting the first nonce from the first authentication value to acquire the second authentication value.

The transmitting of the third authentication value may include based on the second authentication value being received, decrypting the second authentication value using the decryption key to acquire the third authentication value, and transmitting the third authentication value to the server, in which the server may identify whether a value obtained by subtracting the second nonce from the third authentication value is greater than or equal to a threshold to authenticate the user.

MODE FOR INVENTION

Figure 1:
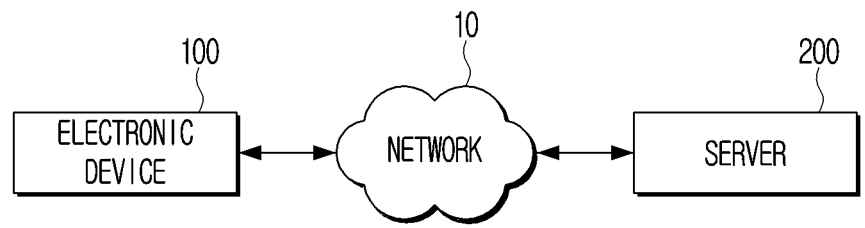
FIG. 1 is a diagram illustrating a user authentication system according to an embodiment of the present disclosure.

Hereinafter, the present disclosure will be described in detail with reference to the accompanying drawings. Encryption/decryption may be applied to an information (data) transmission process performed in the present disclosure, and all expressions describing the information (data) transmission process in the present disclosure and claims should be interpreted as including cases of encryption/decryption even if not separately stated. In the present disclosure, expressions such as "transmission (delivery) from A to B" or "A receiving from B" include transmission (delivery) or reception with another medium included therebetween, and does not necessarily express only what is directly transmitted (delivered) or received from A to B.

In the description of the present disclosure, the order of each step should be understood as non-limiting unless the preceding step needs to be logically and temporally performed necessarily before the following step. In other words, except for the above exceptional cases, even if the process described as the following step is performed before the process described as the preceding step, the nature of the disclosure is not affected, and the scope should also be defined regardless of the order of the steps. In this specification, "A or B" is defined to mean not only selectively indicating either one of A and B, but also including both A and B. In addition, in the present disclosure, the term "include" has a meaning encompassing further including other components in addition to elements listed as included.

In this disclosure, only essential components necessary for the description of the present disclosure are described, and components unrelated to the essence of the present disclosure are not mentioned. In addition, it should not be interpreted as an exclusive meaning that includes only the mentioned components, but should be interpreted as a non-exclusive meaning that may include other components.

In addition, in the present disclosure, "value" is defined as a concept including a vector and a polynomial form as well as a scalar value.

Mathematical operations and calculations of each step of the present disclosure to be described below may be implemented as computer operations by the known coding method and/or coding designed to suit the present disclosure for the corresponding operation and calculation.

Specific equations to be described below are illustratively described among possible alternatives, and the scope of the present disclosure should not be construed as being limited to equations mentioned in the present disclosure.

For convenience of description, in the present disclosure, a notation is defined as follows.

$a \leftarrow D$: select element (a) according to distribution (D)

$s_1, s_2 \in R$: Each of $s_1$ and $s_2$ is an element belonging to set R mod(q): Modular operation with element q

[-]: Round-off internal value

Hereinafter, diverse exemplary embodiments of the present disclosure will be described in detail with reference to the accompanying drawings.

FIG. 1 is a diagram for describing a user authentication system according to an embodiment of the present disclosure.

Referring to FIG. 1, the user authentication system may include an electronic device 100 and a server 200, and each component may be connected to each other through a network 10.

The network 10 may be implemented in various types of wired and wireless communication networks, broadcasting communication networks, optical communication networks, cloud networks, etc., and each apparatus may also be connected through methods such as Wi-Fi, Bluetooth, Near Field Communication (NFC), etc., without a separate medium.

The electronic device 100 illustrated in FIG. 1 may be implemented as various types of devices such as smart phones, tablets, game players, PCs, laptop PCs, home servers, and kiosks. In addition, the electronic device may be implemented in the form of home appliances to which an IoT function is applied.

The server 200 illustrated in FIG. 1 may be a server that provides various services, functions, etc., that require user authentication. In this case, in FIG. 1, the server 200 is implemented as one, but this is only an example and may be implemented as a plurality of servers.

Users may input various types of information through the electronic device 100 they use. The input information may be stored in the electronic device 100 itself, but may also be transmitted to and stored in an external device for reasons such as storage capacity, security, etc. In FIG. 1, the server 200 may play the role of storing such information. As an example, the electronic device 100 may acquire user's identification information and authentication information (for example, a password or biometric information) and transmit homomorphic encrypted authentication information to the server 200. The server 200 may store the homomorphic encrypted authentication information.

The electronic device 100 may perform homomorphic encryption (HE) on the input information and transmit a homomorphic encrypted message (or homomorphic encryption data) to the server 200. As an example, the homomorphic encrypted message may be homomorphic encrypted authentication information.

Meanwhile, the electronic device 100 and the server 200 may share a homomorphic encryption scheme to be used for the user authentication and an algorithm below. In this case, when a plaintext is in a vector format, + and * operations of the vector may mean performing addition and multiplication for each element at the same location.

KeyGen(param)→ek, dk: Input a homomorphic encryption parameter param to a key generation algorithm to generate an encryption key ek and a decryption key dk.

Enc(ek, m)→c: Encrypt a plaintext m with the encryption key ek to calculate an encrypted message c.

Dec(dk, c)→m: Decrypt the encrypted message c with the decryption key dk to calculate the plaintext m.

Add(c1, op)→c2: Expressed by +, add an encrypted message c1 and a plaintext or encrypted message operand op to calculate c2 which is Dec(c2)=Dec(dk, c1)+op.

Mul(c1, op)→c2: Expressed by *, multiply the encrypted message c1 by the plaintext or encrypted message operand op to calculate c2 which is Dec(c2)=Dec(dk, c1)*op.

H1(x), H2(x), H3(x): Cryptographic hash functions that output a fixed-length digest for an input message x of arbitrary length.

x|y: Concatenates byte strings x and y.

The electronic device 100 may request and acquire the homomorphic encryption parameter param to be used for user authentication from the server 200 or set the acquired homomorphic encryption parameter param to a value previously shared with the server 200. The electronic device 100 may generate the encryption key ek and decryption key dk using the key generation algorithm KeyGen (param).

Meanwhile, the electronic devices 100 may include encryption noise, i.e., an error, generated in the process of performing the homomorphic encryption in the encrypted message. For example, the homomorphic encrypted message generated by the electronic device 100 may be generated in a form in which a result value including a message and an error value is restored when decrypted later using a secret key.

For example, when the homomorphic encrypted message generated by the electronic device 100 is decrypted using the secret key, the homomorphic encrypted message may be generated in a form that satisfies the following natures.

$$Dec(ct, sk) = <ct, sk> = M + e(\mod q) \quad \text{[Equation 1]}$$

Here, $<, >$ denotes a usual inner product, ct denotes an encrypted message, sk denotes a secret key, M denotes a plaintext message, e denotes an encryption error value, and mod q denotes a modulus of an encrypted message. q should be selected to be greater larger than a result value M obtained by multiplying a scaling factor $\Delta$ by a message. When an absolute value of the error value e is sufficiently small compared to M, a decryption value M+e of the encrypted message is a value that may replace the original message with the same precision in significant figure operation. Among the decrypted data, an error may be arranged on the least significant bit (LSB) side, and M may be arranged on the next least significant bit side.

When a size of the message is too small or too large, the size may be adjusted using a scaling factor. When the scaling factor is used, not only an integer type message but also a real number type message may be encrypted, and thus, the usability of the message may be greatly increased. In addition, by adjusting the size of the message using the scaling factor, a size of an area where messages exist in the encrypted message after the operation is made, that is, a size of an effective area may also be adjusted.

According to the embodiment, a modulus q of the encrypted message may be set and used in various forms. For example, the modulus of the encrypted message may be set in the form of an exponential power q-$\Delta^L$ of the scaling factor $\Delta$. When $\Delta$ is 2, $\Delta$ may be set to a value such as q=$2^{10}$.

As another example, an encrypted message modulus may be set to a value multiplied by a plurality of different scaling factors. Each factor may be set to a value within a similar range, that is, a value of similar size. For example, q=$q_1$ $q_2$ $q_3$, . . . , qx, and $q_1$ $q_2$ $q_3$, . . . , qx each have a size similar to the scaling factor $\Delta$ and may be set to values with a co-prime relationship.

When the scaling factor is set in this way, the entire operation may be performed by being separated into a plurality of modulus operations according to Chinese remainder theorem (CRT), thereby reducing the operation burden.

In addition, by using factors of similar sizes, when rounding is performed in the step described later, substantially the same result as the result value in the previous example may be obtained.

The server 200 may store the received homomorphic encrypted message in an encrypted message state without decrypting received homomorphic encrypted message.

As described above, the electronic device 100 may transmit the homomorphic encrypted authentication information to the server 200 and register the homomorphic encrypted authentication information, and the electronic device 100 and the server 200 may perform the user authentication based on the homomorphic encrypted authentication information registered in the server 200. As a result, even if the homomorphic encrypted authentication information stored in the server 200 is leaked, an attacker may not easily confirm the authentication information. Accordingly, the security of the user authentication information may be further strengthened.

Hereinafter, with reference to the drawings, a method of performing homomorphic encryption on user's authentication information, registering the homomorphic encryption in the server 200, and performing the user authentication using the user's authentication information will be described in more detail.

Figure 2:
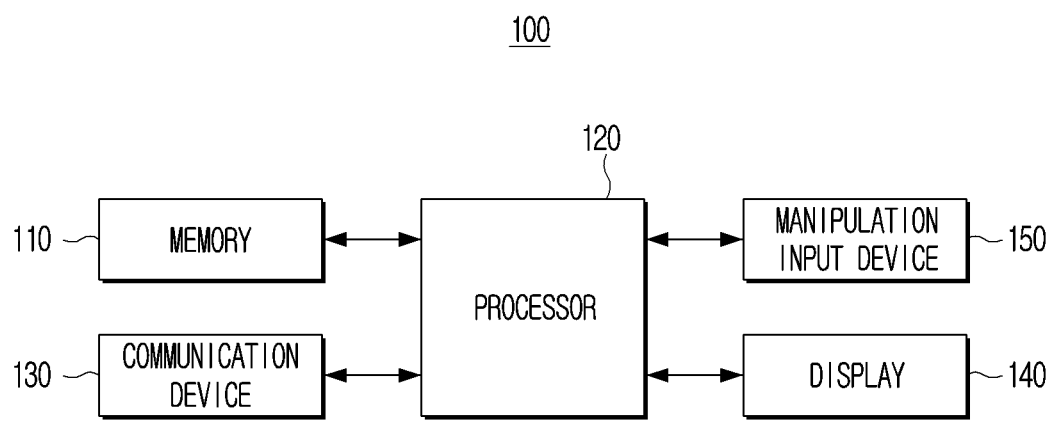
FIG. 2 is a block diagram illustrating a configuration of an electronic device according to an embodiment of the present disclosure.

FIG. 2 is a block diagram illustrating a configuration of the electronic device according to the embodiment of the disclosure.

Referring to FIG. 2, the electronic device 100 may include the memory 110, the processor 120, a communication device 130, a display 140, and a manipulation input device 150. The electronic device may be various devices such as a personal computer (PC), a laptop computer, a smart phone, a tablet, and a server.

At least one instruction regarding the electronic device 100 may be stored in the memory 110. For example, the memory 110 may store various programs (or software) for operating the electronic device 100 according to various embodiments of the present disclosure.

The memory 110 may be implemented in various forms such as RAM, ROM, buffer, cache, flash memory, HDD, external memory, and memory card, but is not limited to any one.

The memory 110 may store messages to be encrypted. Here, the message may be the user's authentication information (e.g., password, biometric information, etc.). In addition, the memory 110 may store the encryption key and the decryption key for the homomorphic encryption.

In addition, the memory 110 may store a public key, and when the electronic device 100 directly generates the public key, the memory 420 may store not only a secret key, but also various parameters necessary for generating the public key and the secret key.

In addition, the memory 110 may store the homomorphic encrypted message (e.g., encrypted authentication information, etc.) generated in the process described later. Also, the memory 110 may store the homomorphic encrypted message transmitted from the external device. Also, the memory 110 may store the operation result encrypted message that is the result of the operation process.

The communication device 130 is formed to connect the electronic device 100 to an external device (not illustrated), and may be connected to the external device through a local area network (LAN) and the Internet network or be connected to the external device through a USB port or a wireless communication (for example, wireless fidelity (Wi-Fi), 802.11a/b/g/n, near field communication (NFC), or Bluetooth) port. Such a communication device 130 may also be referred to as a transceiver.

The communication device 130 may receive the public key from the external device and may transmit the public key generated by the electronic device 100 itself to an external device.

Also, the communication device 130 may receive a message from the external device and transmit the generated homomorphic encrypted message or the operation result to the external device.

Also, the communication device 130 may receive various parameters required for generating an encrypted message from an external device. Meanwhile, upon implementation, various parameters may be directly received from a user through the manipulation input device 150 to be described later.

In addition, the communication device 130 may receive a request for an operation of the homomorphic encrypted message from an external device and transmit the calculated result to the external device. Here, the requested operation may be an operation such as addition, subtraction, or multiplication (for example, a modular multiplication operation), or may be a statistical operation. Here, the modular multiplication operation means a modular operation with q elements.

In particular, the communication device 130 may register the user's identification information and the authentication information in the server 200 and transmit and receive various types of information to authenticate the user.

The display 140 displays a user interface window for selecting a function supported by the electronic device 100. For example, the display 140 may display a user interface window for selecting various functions provided by the electronic device 100. The display 140 may be a monitor such as a liquid crystal display (LCD) and organic light emitting diodes (OLED), and may be implemented as a touch screen capable of simultaneously performing the functions of the manipulation input device 150 to be described later.

The display 140 may display a message requesting input of parameters necessary for generating a secret key and a public key. Also, the display 140 may display a message in which an encryption target selects a message. Meanwhile, in implementation, the encryption target may be directly selected by a user or may be automatically selected. That is, personal information (e.g., authentication information) or the like that requires encryption may be automatically set even if a user does not directly select a message.

The manipulation input device 150 may select a function of the electronic device 100 and receive a control command for the function from the user. For example, the manipulation input device 150 may receive parameters necessary for generating a secret key and a public key from the user. Also, the manipulation input device 150 may receive a message to be encrypted from a user.

The processor 120 may control the overall operation of the electronic device 100. For example, the processor 120 may generally control the operation of the electronic device 100 by executing at least one instruction stored in the memory 110. The processor 120 may be composed of a single device such as a central processing unit (CPU) and an application-specific integrated circuit (ASIC), or may be composed of a plurality of devices such as a CPU and a graphics processing unit (GPU).

According to one embodiment of the present disclosure, the processor 120 acquires a hash value using a first password based on the user's identification information and the first password being input to register the user's identification information and the first password. The processor 120 encrypts the hash value using the encryption key. The processor 120 transmits the identification information and the encrypted hash value to the server 200 through the communication device 130. Based on the identification information and a second password being input to log in to the server 200, the processor 120 may load the encryption key and the decryption key and transmit the identification information to the server 200 through the communication device 130. Based on a first nonce being received from the server 200, the processor 120 acquires a first authentication value using the decryption key, the second password, and the first nonce, and transmits the first authentication value to the server 200 through the communication device 130. Based on the first authentication value and a second authentication value generated using a second nonce being received from the server 200, the processor 120 decrypts the second authentication value using the decryption key to acquire a third authentication value, and transmits the third authentication value to the server 200 through the communication device 130. In this case, the server 200 may authenticate the user using the third authentication value.

In one embodiment, the processor 120 may input the decryption key to a first hash value to acquire the first hash value. The processor 120 may concatenate the first hash value and the first password and input the concatenated value to a second hash function to acquire a second hash value. The processor 120 may encrypt the second hash value using the encryption key. The processor 120 may transmit the identification information and the encrypted second hash value to the server 200 through the communication device 130.

In one embodiment, based on the first nonce being received from the server 200, the processor 120 may input the decryption key to the first hash function to acquire a third hash value. The processor 120 may concatenate the third hash value and the second password and input the concatenated value to the second hash function to acquire a fourth hash value. The processor 120 may encrypt the fourth hash value using the encryption key. The processor 120 may add the first nonce to the encrypted fourth hash value to acquire the first authentication value.

In one embodiment, based on the server 200 adding the second nonce to a value obtained by subtracting the first nonce and the encrypted hash value from the first authentication value to acquire the second authentication value, the processor 120 may receive the second authentication value from the server 200 through the communication device 130.

In one embodiment, based on the second authentication value being received, the processor 120 may decrypt the second authentication value using the decryption key. The processor 120 may input the decrypted value to a third hash function to acquire a third authentication value. The processor 120 may transmit the third authentication value to the server 200 through the communication device 130. In this case, the server 200 may identify whether the third authentication value and a value obtained by inputting the second nonce to the third hash function are the same to authenticate the user.

According to another embodiment of the present disclosure, based on the user's identification information and first biometric information being input to register the user's identification information and the first biometric information, the processor 120 preprocesses the first biometric information. The processor 120 encrypts the preprocessed first biometric information using the encryption key. The processor 120 transmits the identification information and the encrypted biometric information to the server 200 through the communication device 130. Based on the identification information and second biometric information being input to log in to the server 200, the processor 120 may load the encryption key and the decryption key and transmit the identification information to the server 200 through the communication device 130. Based on the first nonce being received from the server 200, the processor 120 acquires the first authentication value using the decryption key, the second biometric information, and the first nonce, and transmits the first authentication value to the server 200 through the communication device 200. Based on the first authentication value and the second authentication value generated using the second nonce being received from the server 200, the processor 120 decrypts the second authentication value using the decryption key to acquire the third authentication value, and transmits the third authentication value to the server 200 through the communication device 130. In this case, the server 200 authenticates the user using the third authentication value.

In another embodiment, based on the first nonce being received from the server 200, the processor 120 may preprocess the second biometric information. The processor 120 may add the first nonce to the preprocessed value to acquire the first value. The processor 120 may encrypt the first value using the encryption key to acquire the first authentication value.

In another embodiment, based on the server 200 adding the second nonce to a value obtained by multiplying the encrypted biometric information by a value obtained by subtracting the first nonce from the first authentication value to acquire the second authentication value, the processor 120 may receive the second authentication value from the server 200 through the communication device 130.

In another embodiment, based on the second authentication value being received, the processor 120 may decrypt the second authentication value using the decryption key to acquire the third authentication value. The processor 120 may transmit the third authentication value to the server 200 through the communication device 130. In this case, the server 200 may identify whether the value obtained by subtracting the second nonce from the third authentication value is greater than or equal to the threshold to authenticate the user.

Various operations of the processor 120 will be described in more detail with reference to FIGS. 4 to 7.

Figure 3:
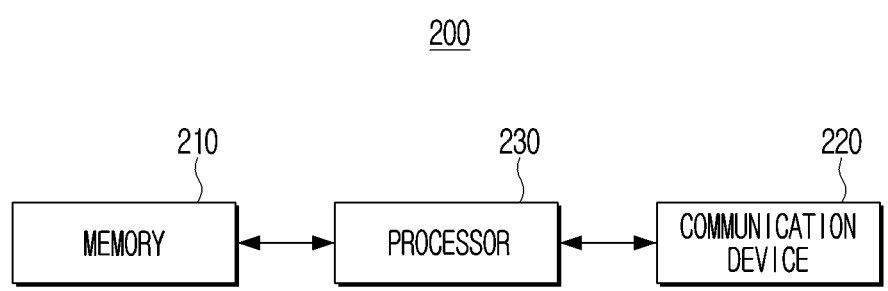
FIG. 3 is a block diagram illustrating a configuration of a server according to an embodiment of the present disclosure.

FIG. 3 is a block diagram illustrating a configuration of a server according to an embodiment of the present disclosure.

Referring to FIG. 3, the server 200 may include a memory 210, a communication device 220, and a processor 230. In this case, the server 200 is a server for providing various functions and services. In this case, the server 200 may require the user authentication to perform various functions and services.

At least one instruction regarding the server 200 may be stored in the memory 210. For example, the memory 210 may store various programs (or software) for operating the server 200 according to various embodiments of the present disclosure.

The memory 210 may be implemented in various forms such as RAM, ROM, buffer, cache, flash memory, HDD, external memory, and memory card, but is not limited to any one.

The memory 210 may store the homomorphic encrypted authentication information (e.g., encrypted hash value, encrypted biometric information, etc.) received from the electronic device 100.

The communication device 220 is formed to connect the server 200 to an external device (not illustrated), and may be connected to the external device through a local area network (LAN) and the Internet network or be connected to the external device through a USB port or a wireless communication (for example, wireless fidelity (WiFi), 802.11a/b/g/n, near field communication (NFC), or Bluetooth) port. Such a communication device 220 may also be referred to as a transceiver.

The communication device 220 may register the user's identification information and the authentication information in the server 200 and transmit and receive various types of information to authenticate the user.

The processor 230 generally controls an overall operation of the server 200. For example, the processor 230 may generally control the operation of the server 200 by executing at least one instruction stored in the memory 210. The processor 230 may be composed of a single device such as a central processing unit (CPU) and an application-specific integrated circuit (ASIC), or may be composed of a plurality of devices such as a CPU and a graphics processing unit (GPU).

According to an embodiment of the present disclosure, the processor 230 may receive the identification information and the encrypted authentication information (e.g., a hash value encrypted using a password, etc.) received from the electronic device 100 through the communication device 220, and store the received identification information and encrypted authentication information in the memory 210. After the identification information and the encrypted authentication information are registered, based on the identification information being received, the processor 230 may generate the first nonce and load the encrypted second hash value corresponding to the received identification information. Based on the password for logging in and the first authentication value acquired by using the first nonce being received from the electronic device 100, the processor 230 may generate the second authentication value using the first authentication value and the second nonce, and transmit the second authentication value to the electronic device 100 through the communication device 220. Based on the third authentication value acquired by decrypting the second authentication value using the decryption key being received from the electronic device 100, the processor 230 may authenticate the user using the third authentication value.

According to another embodiment of the present disclosure, the processor 230 may receive the identification information and the encrypted authentication information (e.g., encrypted biometric information, etc.) received from the electronic device 100 through the communication device 220, and store the received identification information and encrypted authentication information in the memory 210. After the identification information and the encrypted authentication information are registered, based on the identification information being received, the processor 230 may generate the first nonce and load the encrypted biometric information corresponding to the received identification information. Based on the biometric information for logging in, the decryption key, and the first authentication value acquired by using the first nonce being received from the electronic device 100, the processor 230 may generate the second authentication value using the first authentication value and the second nonce, and transmit the generated second authentication value to the electronic device 100 through the communication device 220. Based on the third authentication value obtained by decrypting the second authentication value using the decryption key being received from the electronic device 100, the processor 230 may authenticate the user using the third authentication value.

Various operations of the processor 230 will be described in more detail with reference to FIGS. 4 to 7.

Figure 4:
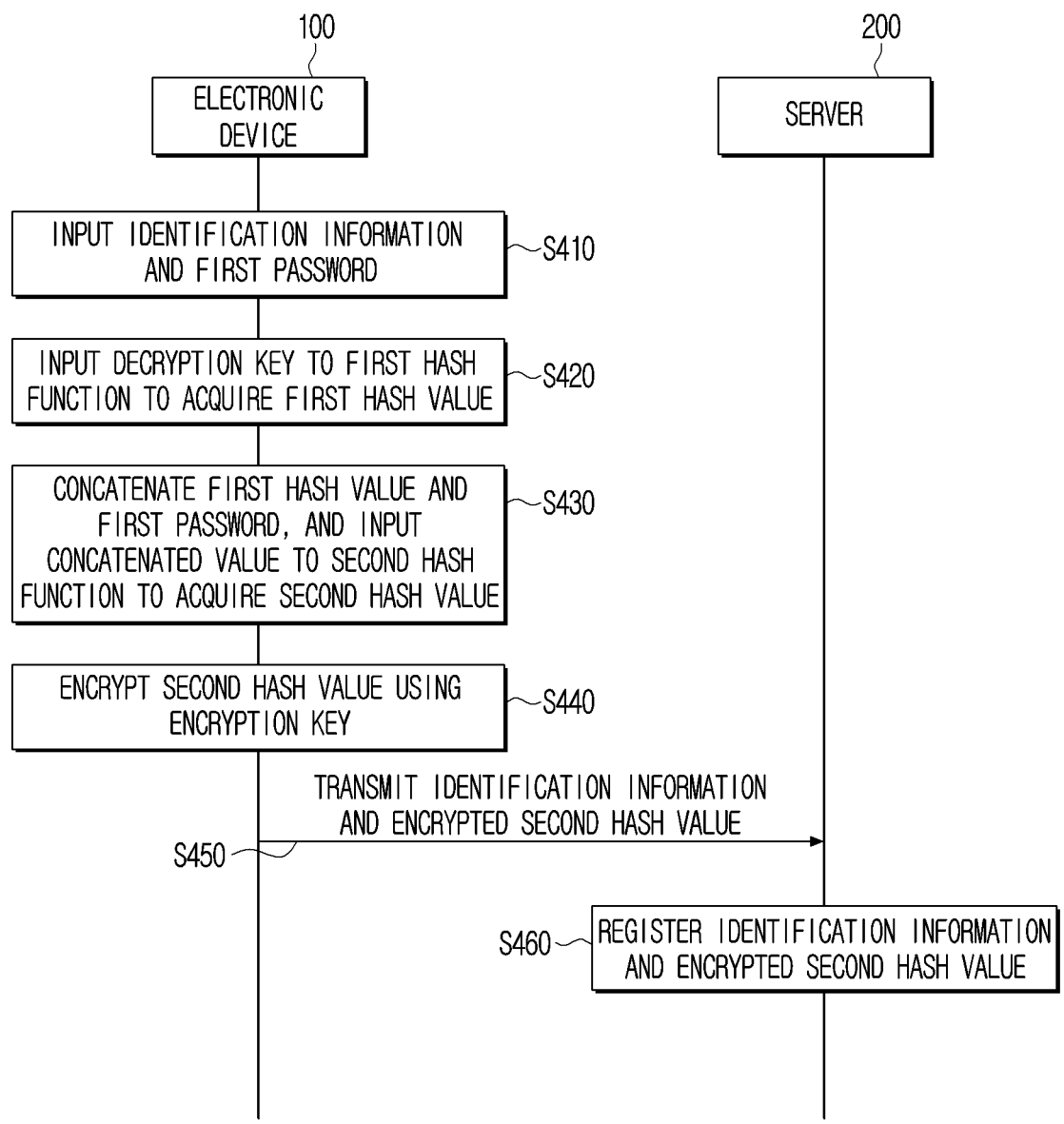
FIG. 4 is a sequence diagram illustrating a method of registering user's identification information and password in a server according to an embodiment of the present disclosure.

FIG. 4 is a sequence diagram illustrating a method of registering user's identification information and password in a server according to an embodiment of the present disclosure.

First, the electronic device 100 may receive the identification information and the first password (S410). In this case, the identification information is information representing the user, and the first password may be the authentication information for being registered in the server 200 so that the user may log in to the server 200. Each of the identification information and the first password may include at least one of text, numbers, and special characters. In this case, the electronic device 100 may load the encryption key and the decryption key to perform the homomorphic encryption on the first password. The encryption key and the decryption key may be keys generated by the key generation algorithm described above.

The electronic device 100 may input the decryption key to the first hash function to acquire the first hash value (S420). Specifically, the electronic device 100 may input the loaded decryption key to the first hash function to acquire a first hash value H1(dk). In this case, the first hash value may be referred to as "digest of the decryption key."

The electronic device 100 concatenates the first hash value and the first password and inputs the concatenated value to the second hash function to acquire a second hash value H2(H1(dk)|password) (S430).

The electronic device 100 may encrypt the second hash value using the encryption key (S440). Specifically, the electronic device 100 may convert the second hash value into the message of the homomorphic encryption and encrypt the converted message using the encryption key. That is, the electronic device 100 may obtain an encrypted second hash value chk using Equation 1 below.

$$chk = Enc(ek, H2(H1(dk)|password)) \quad \text{[Equation 1]}$$

The electronic device 100 may transmit the identification information and the encrypted second hash value to the server 200 (S450). That is, the electronic device 100 may transmit the matched identification information id and encrypted second hash value chk to the server 200.

The server 200 may register identification information id and the encrypted second hash value chk (S460).

As described above, the server 200 does not directly store the identification information and the first password, but stores the identification information and the encrypted second hash value received from the electronic device 100, so, even if attacks occur by an external attacker, the server may not generate the first password.

Figure 5:
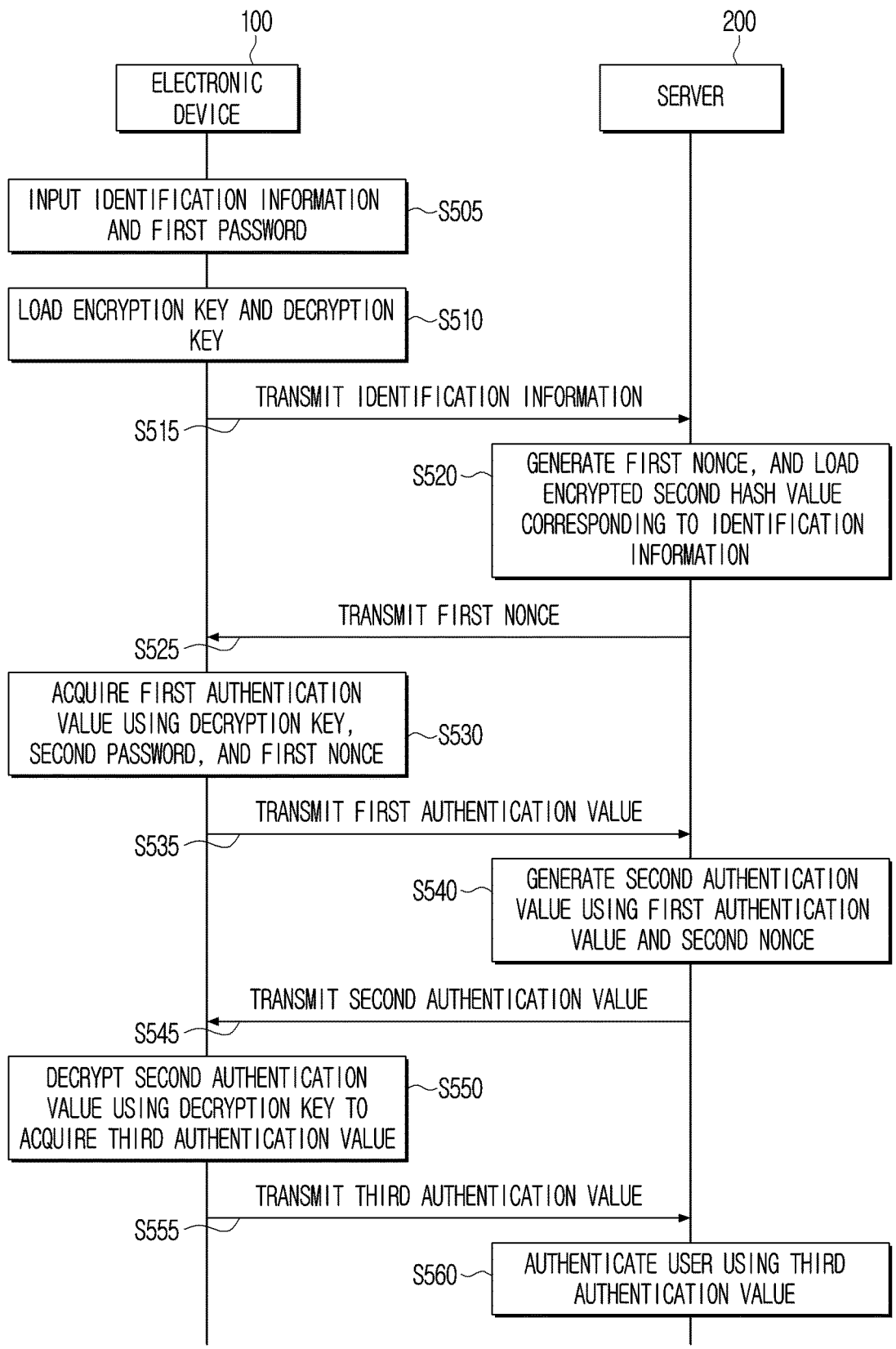
FIG. 5 is a sequence diagram for describing a method of authenticating a user using a password according to an embodiment of the present disclosure.

FIG. 5 is a sequence diagram for describing a method of authenticating a user using a password according to an embodiment of the present disclosure. In this case, the server may store the user's identification information and the encrypted second hash value chk described in FIG. 4.

The electronic device 100 may receive the identification information and the second password (S505). In this case, the second password may be the authentication information for the user to log in to the server 200. The second password may be expressed as 'password' to be distinguished from the first password.

The electronic device 100 may load the encryption key and the decryption key (S510). In this case, the encryption key and the decryption key may be keys generated by the key generation algorithm described above.

The electronic device 100 may transmit the input identification information to the server 200 (S515).

The server 200 may generate the first nonce and load the encrypted second hash value corresponding to the identification information (S520). That is, the server 200 may load the encrypted second hash value chk corresponding to the identification information received from the electronic device 100 using the pre-stored id and chk pairs. The first nonce may be a number randomly sampled by a nonce generator within a defined range.

The server 200 may transmit the generated first nonce to the electronic device 100 (S525).

The electronic device 100 may obtain the first authentication value using the decryption key, the second password, and the first nonce (S530). In this case, the electronic device 100 should prove that the first password and the second password are the same using the first nonce. Specifically, based on the first nonce being received from the server 200, the electronic device 100 may input the loaded decryption key dk to the first hash function H1 to acquire the third hash value H1(dk). The electronic device 100 may concatenate the third hash value and the second password and input the concatenated value to the second hash function to acquire a fourth hash value H2(H1(dk)|password'. The electronic device 100 may encrypt the fourth hash value using the loaded encryption key and add the first nonce to the encrypted fourth hash value to acquire the first authentication value. That is, the electronic device 100 may obtain a first authentication value p1 using Equation 2 below.

$$p1 = Enc(ek, H2(H1(dk) \,|\, \text{password}')) + r1 \qquad \text{[Equation 2]}$$

The electronic device 100 may transmit the first authentication value to the server 200 (S535).

The server 200 may generate the second authentication value using the first authentication value and the second nonce (S540). Specifically, the server 200 may add the second nonce to the value obtained by subtracting the first nonce and the encrypted hash value (i.e., the encrypted second hash value corresponding to the identification information loaded in step S520) from the first authentication value to acquire the second authentication value.

That is, the server 200 may acquire a value chk' obtained by subtracting a first nonce r1 and the encrypted hash value chk from the first authentication value p1, as shown in Equation 3 below.

$$chk' = p1 - r1 - chk \qquad \text{[Equation 3]}$$

In this case, when the first password and the second password are the same, chk' becomes an encrypted message of 0. Accordingly, the server 200 may authenticate whether chk' is the encrypted message of 0 to identify whether the first password and the second password are the same.

The server 200 may generate the second nonce and add the second nonce r2 to chk' to acquire a second authentication value ch, as shown in Equation 4 below.

$$ch = chk' + r2 \qquad \text{[Equation 4]}$$

The server 200 may transmit the second authentication value to the electronic device 100 (S545).

The electronic device 100 may decrypt the second authentication value using the decryption key to acquire the third authentication value (S550). Specifically, based on the second authentication value being received, the electronic device 100 may decrypt the second authentication value using the loaded decryption key. That is, the electronic device 100 may decrypt the second authentication value ch to prove the possession of the decryption key. The electronic device 100 may input the decrypted value to the third hash function to acquire a third authentication value p2, as shown in Equation 5 below.

$$p2 = H3(Dec(dk, ch)) \qquad \text{[Equation 5]}$$

The electronic device 100 may transmit the third authentication value to the server 200 (S555).

The server 200 may authenticate the user using the third authentication value (S560). In this case, the server 200 may identify whether the third authentication value p2 and a value H3(r2) obtained by inputting the second nonce to the third hash function are the same to authenticate the user.

That is, as described above, when the first password and the second password are the same, chk' becomes the encrypted message of 0. Therefore, by confirming that Dec(dk, H3(p1−chk'−r1+r2)) is the same as the value H3(r2) obtained by inputting the second nonce to the third hash function, it is possible to identify that the first password and the second password are the same and identify that the electronic device 100 possesses the decryption key dk.

When the user authentication succeeds, the server 200 may transmit information on the user authentication success to the electronic device 100, and the electronic device 100 may log in to the server 200 and perform services or functions provided by the server 200. However, when the user authentication fails, the server 200 may transmit the information on the user authentication failure to the electronic device 100, and the electronic device 100 may display a UI, which guides a new password to be input, on the display 140.

As described above, by identifying that p1−r1−chk=0 is satisfied to prove that the first password and the second password are the same, the server 200 may perform knowledge verification, and the electronic device 100 may decrypt the second authentication value using the decryption key, so the electronic device 100 may perform the verification of possession of the decryption key.

Figure 6:
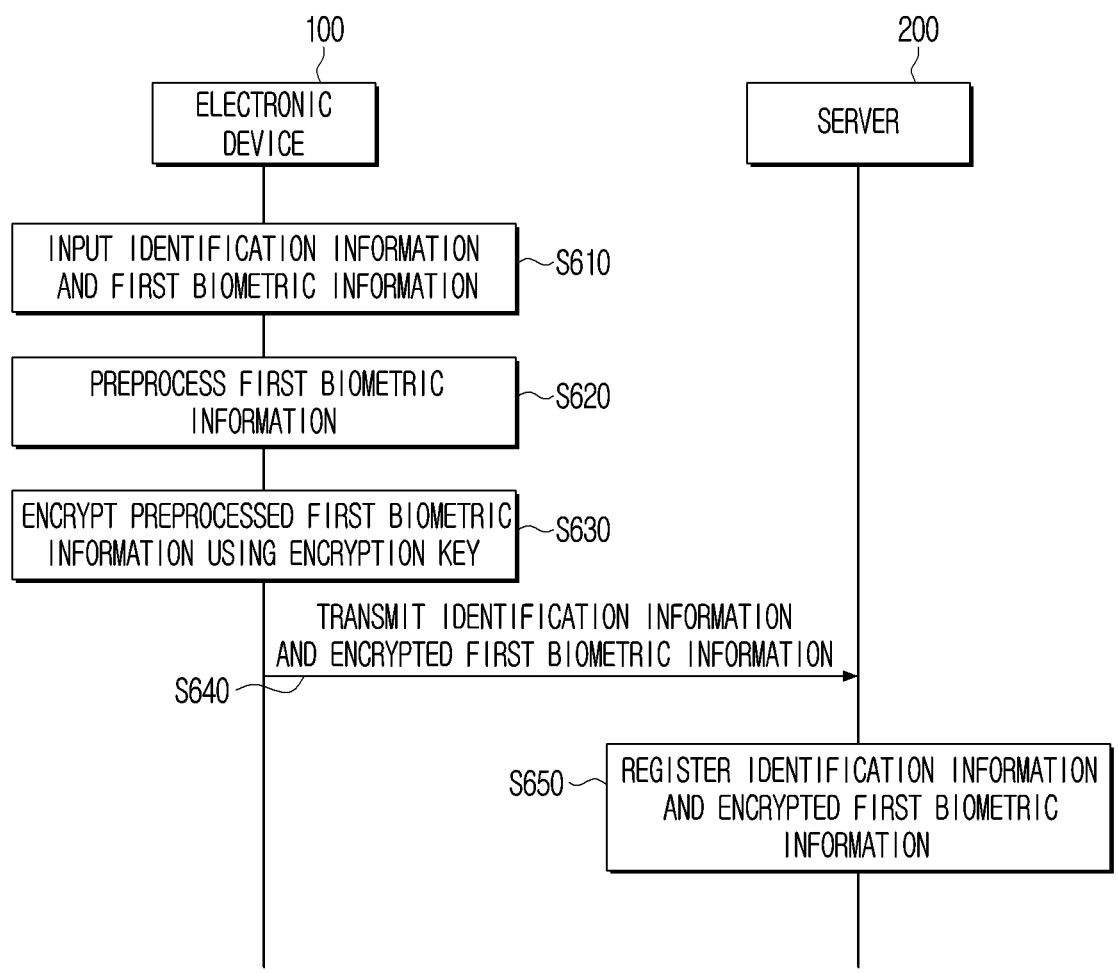
FIG. 6 is a sequence diagram for describing a method of registering user's identification information and biometric information in a server according to an embodiment of the present disclosure.

FIG. 6 is a sequence diagram for describing a method of registering user's identification information and biometric information in a server according to an embodiment of the present disclosure.

First, the electronic device 100 may receive the identification information and the first biometric information (S610). In this case, the identification information is information representing the user, and the biometric information may be the authentication information for being registered in the server 200 so that the user may log in to the server 200. The identification information may include at least one of text, numbers, and special characters, and the biometric information may include various types of biometric information such as fingerprints, irises, faces, etc., acquired through sensors (e.g., fingerprint sensors, image sensors, etc.), and the biometric information may be expressed as a numerical value such as a metric. In this case, the electronic device 100 may load the encryption key and the decryption key to perform the homomorphic encryption on the first biometric information. The encryption key and the decryption key may be keys generated by the key generation algorithm described above.

The electronic device 100 may preprocess the first biometric information (S620). Specifically, the electronic device 100 may preprocess the first biometric information (metric) using Equation 6 below.

$$norm = metric/\|metric\| \qquad \text{[Equation 6]}$$

The electronic device 100 may encrypt preprocessed first biometric information norm using the encryption key (S630). Specifically, the electronic device 100 may obtain the first biometric information chk encrypted using an encryption key ek, as shown in Equation 7 below.

$$chk = Enc(ek, norm) \qquad \text{[Equation 7]}$$

The electronic device 100 may transmit the identification information and the encrypted first biometric information to the server 200 (S640). That is, the electronic device 100 may transmit the matched identification information id and encrypted first biometric information chk to the server 200.

The server 200 may register the identification information id and the encrypted first biometric information chk (S650).

As described above, the server 200 does not directly store the identification information and the first biometric information, but stores the identification information and the encrypted first biometric information received from the electronic device 100, so, even if attacks occur by an external attacker, the server may not leak the first biometric information.

Figure 7:
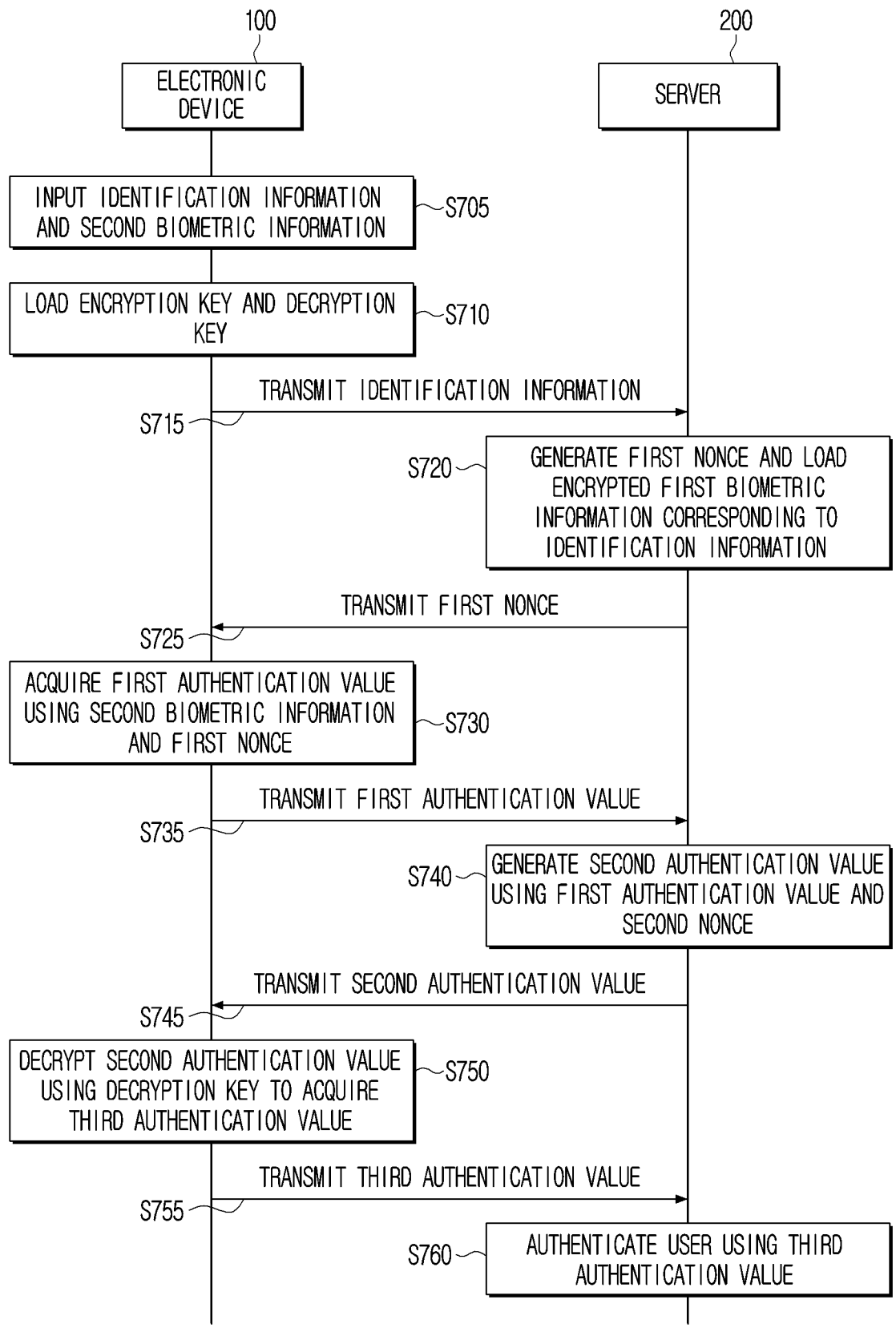
FIG. 7 is a sequence diagram for describing a method of authenticating a user using biometric information according to an embodiment of the present disclosure.

FIG. 7 is a sequence diagram for describing a method of authenticating a user using biometric information according to an embodiment of the present disclosure. In this case, the server may store the user's identification information and the encrypted first biometric information chk described in FIG. 6.

First, the electronic device 100 may receive the identification information and the second biometric information (S705). In this case, the second biometric information may be the authentication information acquired through the sensor for the user to log in to the server 200. The second biometric information may be expressed as 'metric' to be distinguished from the first biometric information.

The electronic device 100 may load the encryption key and the decryption key (S710). In this case, the encryption key and the decryption key may be keys generated by the key generation algorithm described above.

The electronic device 100 may transmit the input identification information to the server 200 (S715).

The server 200 may generate the first nonce and load the encrypted first biometric information corresponding to the identification information (S720). That is, the server 200 may load the encrypted first biometric information chk corresponding to the identification information received from the electronic device 100 using the pre-stored id and chk pairs. The first nonce may be a number randomly sampled by a nonce generator within a defined range.

The server 200 may transmit the generated first nonce to the electronic device 100 (S725).

The electronic device 100 may acquire the first authentication value using the second biometric information and the first nonce (S730). In this case, the electronic device 100 should prove that the first biometric information and the second biometric information are the same using the first nonce. Specifically, based on the first nonce being received from the server 200, the electronic device 100 may preprocess the second biometric information as shown in Equation 8 below.

$$norm' = metric'/\|metric'\| \qquad \text{[Equation 8]}$$

The electronic device 100 may add the first nonce r1 to a preprocessed value norm' to acquire a first value norm'+r1. The electronic device 100 may encrypt the first value norm'+r1 using the encryption key (ek) to acquire the first authentication value p1, as shown in Equation 9 below.

$$p1 = Enc(ek, norm' + r1) \qquad \text{[Equation 9]}$$

The electronic device 100 may transmit the first authentication value to the server 200 (S735).

The server 200 may generate the second authentication value using the first authentication value and the second nonce (S740). Specifically, the server 200 may add the second nonce to a value obtained by multiplying the encrypted biometric information (encrypted first biometric information corresponding to the identification information loaded in step S720) by the value obtained by subtracting the first nonce from the first authentication value to acquire the second authentication value.

That is, the server 200 may acquire a value chk' obtained by multiplying the encrypted biometric information chk by a value obtained by subtracting a first nonce r1 from the first authentication value p1, as shown in Equation 10 below.

$$chk' = (p1 - r1) * chk \qquad \text{[Equation 10]}$$

In this case, when the first biometric information and the second biometric information are the same, chk' may be an encrypted message of cosine similarity that satisfies Equation 11 below.

$$chk' = enc(ek, norm' * norm) \qquad \text{[Equation 11]}$$

The server 200 may generate the second nonce and add the second nonce r2 to chk' to acquire a second authentication value ch, as shown in Equation 12 below.

$$ch = chk' + r2 \qquad \text{[Equation 12]}$$

The server 200 may transmit the second authentication value to the electronic device 100 (S745).

The electronic device 100 may decrypt the second authentication value using the decryption key to acquire the third authentication value (S750). Specifically, based on the second authentication value being received, the electronic device 100 may decrypt the second authentication value using the loaded decryption key to acquire the third authentication value p2, as shown in Equation 13 below. That is, the electronic device 100 may decrypt the second authentication value ch to prove the possession of the decryption key.

$$p2 = Dec(dk, ch) \qquad \text{[Equation 13]}$$

The electronic device 100 may transmit the third authentication value to the server 200 (S755).

The server 200 may authenticate the user using the third authentication value (S760). Specifically, the server 200 may calculate p2-r2 and calculate the sum (p2-r2), which is a sum of all values of the result vector. The server 200 may identify whether a value sum(p2-r2) added to the value obtained by subtracting the second nonce from the third authentication value p2 is greater than or equal to a threshold to authenticate the user, as shown in Equation 14 below.

$$\text{sum}(p2 - r2) >= \text{THRESHOLD} \qquad \text{[Equation 14]}$$

That is, by calculating sum(Dec(dk, (p1−r1)*chk+r2)−r2) =sum((metric/‖metric‖)*(metric'/‖metric‖)), it is possible to identify that the biometric information similarity is a value greater than the threshold THRESHOLD to identify that the first biometric information and the second biometric information are the same and identify that the electronic device 100 possesses the decryption key dk.

When the user authentication succeeds, the server 200 may transmit information on the user authentication success to the electronic device 100, and the electronic device 100 may log in to the server 200 and perform services or functions provided by the server 200. However, when the user authentication fails, the server 200 may transmit the information on the user authentication failure to the electronic device 100, and the electronic device 100 may display a UI, which guides the biometric information to be input again, on the display 140.

As described above, by identifying that sum((p1−r1)*chk) >=THRESHOLD is satisfied to prove that the first biometric information and the second biometric information are the same, the server 200 may perform inherent verification, and the electronic device 100 may decrypt the second authentication value using the decryption key, so the electronic device 100 may perform the verification of possession of the decryption key.

Figure 8:
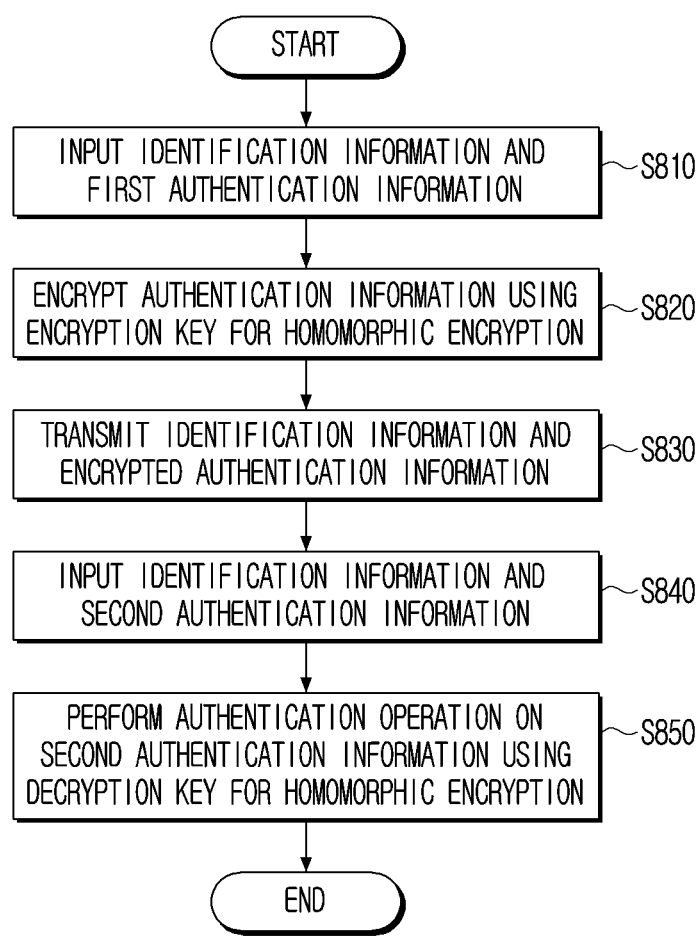
FIG. 8 is a flowchart for describing a control method of an electronic device for authenticating a user using homomorphic encryption, according to an embodiment of the present disclosure.

FIG. 8 is a flowchart for describing a control method of an electronic device for authenticating a user using homomorphic encryption, according to an embodiment of the present disclosure.

The electronic device 100 may receive the identification information and the first authentication information (S810). In this case, the first authentication information may be at least one of the first password or the first biometric information.

The electronic device 100 may encrypt the authentication information using the encryption key for the homomorphic encryption (S820). That is, the electronic device 100 may encrypt the first password or the first biometric information, as described in FIGS. 4 and 6.

The electronic device 100 may transmit the identification information and the encrypted authentication information to the server 200 (S830). That is, the electronic device 100 may transmit the homomorphic encrypted authentication information, rather than the first authentication information, to the server 200.

After the encrypted authentication information is registered in the server 200, the electronic device 100 may receive the identification information and the second authentication information (S840). That is, the electronic device 100 may receive the identification information and the second authentication information for the log in of the user.

The electronic device 100 may perform the authentication operation on the second authentication information using the decryption key for the homomorphic encryption (S850). Specifically, as described in FIGS. 5 and 7, the electronic device 100 may authenticate the encrypted second authentication information using the decryption key to perform the authentication operation of the user.

According to the embodiment of the present disclosure as described above, even if the user's identification information and encrypted hash value stored in the server are leaked, the user's password or biometric information may not be calculated within a meaningful time, so the security may be strengthened. In addition, in order to acquire the password from the encrypted hash value, the decryption key, not the public value, is required, so the password may also be safe against the brute force attack that acquires the password from leaked encrypted hash value. In addition, the user authentication information may be verified through efficient addition and multiplication operations of the homomorphic encryption where the authentication server may operate in the encrypted message state. In addition, by normalizing and encrypting the biometric information vector, it is possible to efficiently calculate the cosine similarity through the multiplication of the homomorphic encryption. In addition, since the homomorphic encryption has quantum-resistant properties, there may be an effect that an attacker may not acquire the password or biometric information even if he/she uses a quantum computer.

Meanwhile, the methods according to various embodiments of the present disclosure may be included and provided in a computer program product. The computer program product may be traded as a product between a seller and a purchaser. The computer program product may be distributed in the form of a machine-readable storage medium (for example, compact disc read only memory (CD-ROM)), or may be distributed (for example, download or upload) through an application store (for example, Play Store™) or may be directly distributed (for example, download or upload) between two user devices (for example, smart phones) online. In a case of the online distribution, at least some of the computer program products (for example, downloadable app) may be at least temporarily stored in a machine-readable storage medium such as a memory of a server of a manufacturer, a server of an application store, or a relay server or be temporarily created.

The methods according to various embodiments of the present disclosure may be implemented by software including instructions stored in a machine-readable storage medium (for example, a computer-readable storage medium). A machine is a device capable of calling a stored instruction from a storage medium and operating according to the called instruction, and may include the electronic device of the disclosed embodiments.

Meanwhile, the machine-readable storage medium may be provided in a form of a non-transitory storage medium. Here, the "non-transitory storage medium" means that the storage medium is a tangible device, and does not include a signal (for example, electromagnetic waves), and the term does not distinguish between the case where data is stored semi-permanently on a storage medium and the case where data is temporarily stored thereon. For example, the "non-transitory storage medium" may include a buffer in which data is temporarily stored.

In a case where a command is executed by the processor, the processor may directly perform a function corresponding to the command or other components may perform the function corresponding to the command under a control of the processor. The command may include codes created or executed by a compiler or an interpreter.

Hereinafter, although exemplary embodiments of the present disclosure have been illustrated and described, the present disclosure is not limited to the above-described specific exemplary embodiments, but may be variously modified by those skilled in the art to which the present disclosure pertains without departing from the gist of the present disclosure as disclosed in the accompanying claims. These modifications should also be understood to fall within the scope and spirit of the present disclosure.

The invention claimed is:

1. An electronic device, comprising:
a communication device;
a memory configured to store an encryption key and a decryption key for performing homomorphic encryption; and
a processor configured to be connected to the memory to control the electronic device,
wherein the processor is configured to:
based on user's identification information and a first password being input to register the user's identification information and the first password, acquire a hash value using the first password,
encrypt the hash value using the encryption key,
transmit the identification information and the encrypted hash value to a server through the communication device,
based on the identification information and a second password being input to log in to the server, load the encryption key and the decryption key and transmit the identification information to the server through the communication device,
based on a first nonce being received from the server, acquire a first authentication value using the decryption key, the second password, and the first nonce and transmit the first authentication value to the server through the communication device,
based on a second authentication value being received from the server, decrypt the second authentication value, which is generated using the first authentication value and a second nonce, using the decryption key to acquire a third authentication value and transmit the third authentication value to the server through the communication device, and
the server authenticates the user using the third authentication value.

2. The electronic device as claimed in claim 1, wherein the processor is configured to input the decryption key to a first hash function to acquire a first hash value,
concatenate the first hash value and the first password, and input the concatenated value to a second hash function to acquire a second hash value,
encrypt the second hash value using the encryption key, and
transmit the identification information and the encrypted second hash value to the server through the communication device.

3. The electronic device as claimed in claim 2, wherein, based on the first nonce being received from the server, the processor is configured to input the decryption key to the first hash function to acquire a third hash value,
concatenate the third hash value and the second password, and input the concatenated value to the second hash function to acquire a fourth hash value,
encrypt the fourth hash value using the encryption key, and
add the first nonce to the encrypted fourth hash value to acquire the first authentication value.

4. The electronic device as claimed in claim 3, wherein the server adds a value obtained by subtracting the first nonce and the encrypted hash value from the first authentication value to the second nonce to acquire the second authentication value, and
the processor is configured to receive the second authentication value from the server through the communication device.

5. The electronic device as claimed in claim 4, wherein, based on the second authentication value being received, the processor is configured to decrypt the second authentication value using the decryption key,
input the decrypted value to a third hash function to acquire the third authentication value, and
transmit the third authentication value to the server through the communication device, and
the server identifies whether the third authentication value and a value obtained by inputting the second nonce to the third hash function are the same to authenticate the user.

6. An electronic device, comprising:
a communication device;
a memory configured to store an encryption key and a decryption key for performing homomorphic encryption; and
a processor configured to be connected to the memory to control the electronic device,
wherein the processor is configured to:
based on user's identification information and a first biometric information being input to register the user's identification information and the first biometric information, preprocess the first biometric information,
encrypt the preprocessed first biometric information using the encryption key,
transmit the identification information and the encrypted biometric information to a server through the communication device,
based on the identification information and second biometric information being input to log in to the server, load the encryption key and the decryption key and transmit the identification information to the server through the communication device,
based on a first nonce being received from the server, acquire a first authentication value using the second biometric information and the first nonce and transmit the first authentication value to the server through the communication device,
based on a second authentication value being received from the server, decrypt the second authentication value, which is generated using the first authentication value and a second nonce, using the decryption key to acquire a third authentication value and transmit the third authentication value to the server through the communication device, and
the server authenticates the user using the third authentication value.

7. The electronic device as claimed in claim 6, wherein, based on the first nonce being received from the server, the processor is configured to preprocess the second biometric information,
add the first nonce to the preprocessed value to acquire a first value, and
encrypt the first value using the encryption key to acquire the first authentication value.

8. The electronic device as claimed in claim 7, wherein the server adds the second nonce to a value obtained by multiplying the encrypted biometric information by a value obtained by subtracting the first nonce from the first authentication value to acquire the second authentication value, and the processor is configured to receive the second authentication value from the server through the communication device.

9. The electronic device as claimed in claim 8, wherein, based on the second authentication value being received, the processor is configured to decrypt the second authentication value using the decryption key to acquire the third authentication value, and transmit the third authentication value to the server through the communication device, and the server identifies whether a value obtained by subtracting the second nonce from the third authentication value is greater than or equal to a threshold to authenticate the user.

10. A control method of an electronic device for storing an encryption key and a decryption key for performing homomorphic encryption, the control method comprising:

based on user's identification information and a first password are input to register the user's identification information and the first password, acquiring a hash value using the first password;

encrypting the hash value using the encryption key;

transmitting the identification information and the encrypted hash value to a server;

based on the identification information and a second password are input to log in to the server, loading the encryption key and the decryption key and transmitting the identification information to the server;

based on a first nonce being received from the server, acquiring a first authentication value using the decryption key, the second password, and the first nonce and transmit the first authentication value to the server; and based on a second authentication value being received from the server, decrypting the second authentication value, which is generated using the first authentication value and a second nonce, using the decryption key to acquire a third authentication value and transmit the third authentication value to the server, wherein the server authenticates the user using the third authentication value.

11. The control method as claimed in claim 10, wherein the acquiring of the hash value includes:

inputting the decryption key to a first hash function to acquire a first hash value;

concatenating the first hash value and the first password, and inputting the concatenated value to a second hash function to acquire a second hash value; and encrypting the second hash value using the encryption key, and in the transmitting of the encrypted hash value to the server, the identification information and the encrypted second hash value are transmitted to the server.

12. The control method as claimed in claim 11, wherein the transmitting of the first authentication value includes:

based on the first nonce being received from the server, inputting the decryption key to the first hash function to acquire a third hash value;

concatenating the third hash value and the second password, and inputting the concatenated value to the second hash function to acquire a fourth hash value;

encrypting the fourth hash value using the encryption key, and adding the first nonce to the encrypted fourth hash value to acquire the first authentication value.

13. The control method as claimed in claim 12, wherein the server adds a value obtained by subtracting the first nonce and the encrypted hash value from the first authentication value to the second nonce to acquire the second authentication value.

14. The control method as claimed in claim 13, wherein the transmitting of the third authentication value includes:

based on the second authentication value being received, decrypting the second authentication value using the decryption key;

inputting the decrypted value to a third hash function to acquire the third authentication value; and transmitting the third authentication value to the server, and the server identifies whether the third authentication value and a value obtained by inputting the second nonce to the third hash function are the same to authenticate the user.

* * * * *